Feb. 10, 1942.  W. S. BRINK  2,272,961
WHEEL CHANGE-OVER UNIT
Filed Feb. 29, 1940  2 Sheets-Sheet 1

INVENTOR
Winfield S. Brink
BY Ely J. Frye
ATTORNEYS

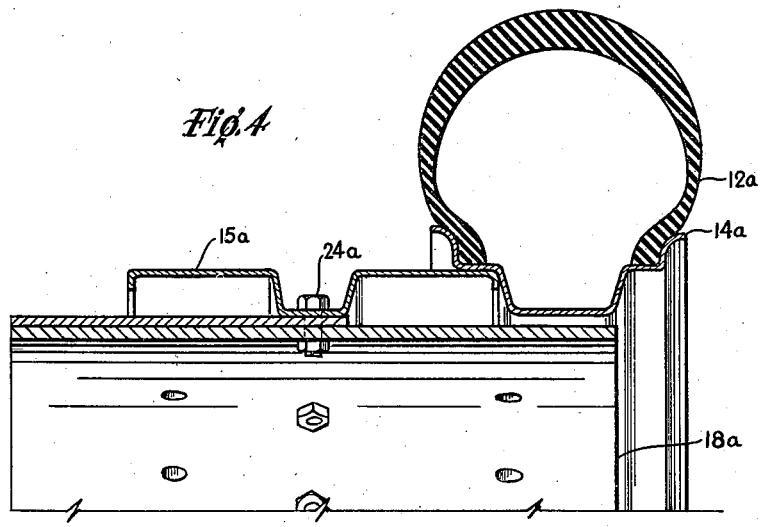
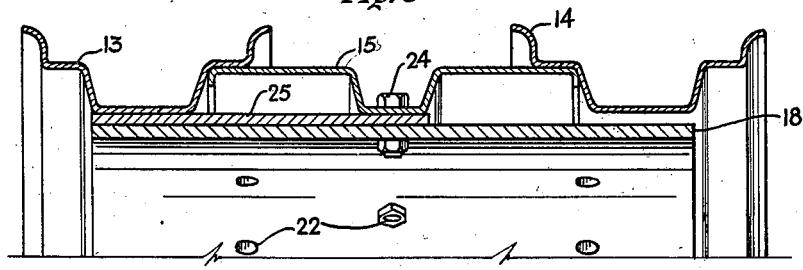
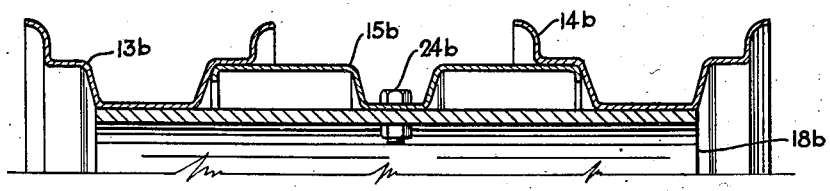

Patented Feb. 10, 1942

2,272,961

UNITED STATES PATENT OFFICE 2,272,961

WHEEL CHANGE-OVER UNIT

Winfield S. Brink, Akron, Ohio, assignor to The Firestone Tire & Rubber Company, Akron, Ohio, a corporation of Ohio Application February 29, 1940, Serial No. 321,489

10 Claims. (Cl. 301—13)

This invention relates to wheels, more especially to wheels used in farm equipment, road-grading machines, and the like.

In the past, substantially all farm equipment, such as tractors, spreaders, etc., as well as many pieces of road-grading machinery have had annular metal wheels. These wheels have been provided with some kind of metallic lugs that usually were bolted or riveted to the annular metallic wheel to form a wheel assembly which had suitable traction for the use to which it was to be subjected. Recently, the advantages of equipping farm machinery, etc., with pneumatic rubber tires has been shown so that the present demand is to adapt the metal wheels to receive rubber tires. Usually changing over these wheels has required reducing the diameter of the metal wheel and placing a new circumferential band thereon, or else buying a new wheel that is adapted to receive pneumatic tires, which operations obviously are expensive and irreversible. Changing a metal wheel, which normally had metal lugs associated therewith to a wheel base construction which is adapted to receive a pneumatic tire, or tires, is made even more difficult in that for some uses the old style metallic lugs may be preferred, whereas pneumatic tires are best for at least a majority of the uses of the wheels. Hence, if possible, the wheels should be adapted to receive, interchangeably, the metallic lugs, or the pneumatic rubber tires.

The general object of the present invention is to provide a simple, sturdy wheel changeover apparatus for metallic wheels, normally having metallic lugs associated therewith, whereby pneumatic tires can be readily and easily substituted therefor.

Another object of the invention is to provide a wheel changeover assembly that is inexpensively constructed, but which is adapted to have long life even though subjected to heavy loads and bumps while in operation.

Another object of the present invention is to provide a wheel changeover band which can be associated with a metal wheel without altering the construction thereof and which requires a minimum of labor to position.

The above and further objects of the invention will be made apparent as the specification proceeds.

Attention is directed to the accompanying drawings, in which:

Figure 4 is an enlarged fragmentary section, similar to Figure 3, of a modification of the invention;

Figure 5 is an enlarged fragmentary section, similar to Figure 3; and

Figure 6 is a fragmentary section of a further embodiment of the invention.

While the present invention is adapted for use with any of a number of types of wheels, it will be described particularly relative to tractor wheels upon which dual pneumatic rubber tires are to be mounted.

Figure 1:
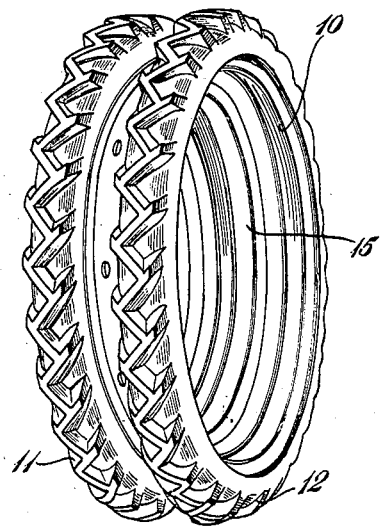
Figure 1 shows a perspective view of one embodiment of the invention.
Figure 3:
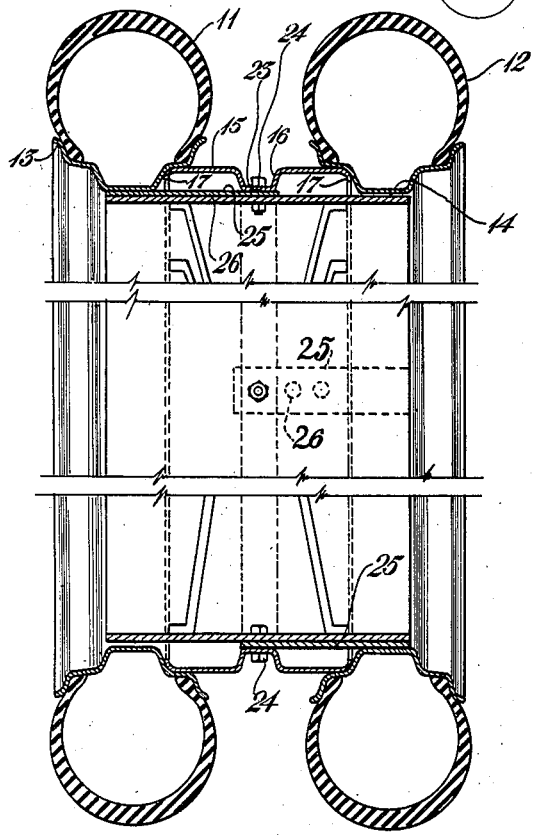
Figure 3 is an enlarged sectional elevation, partly broken away, of the wheel assembly of the invention shown in Figure 2.

Referring specifically to Figure 1 of the drawings, a tread, or wheel assembly 10 is shown which comprises dual tires 11, 12 that are mounted upon rims 13, 14 respectively. These rims 13, 14, are mounted upon, held in spaced relation by, and formed into a unit with an annular mounting band 15 (Figure 3). This mounting band 15 has a recessed, or channelled center portion 16 and inwardly flanged side portions 17 that are spaced radially outwardly from the inner periphery of the recessed center portion 16. These side portions 17 are adapted to engage with the sides of the rims 13 and 14, as shown, and preferably are welded thereto. Usually a series of short, localized welds around the peripheries of the rims are sufficient to unite same integrally to the mounting band 15. Note that the channeled center portion 16 is exposed after the wheel assembly 10 is completed and ready to be associated with a tractor wheel.

Figure 2:
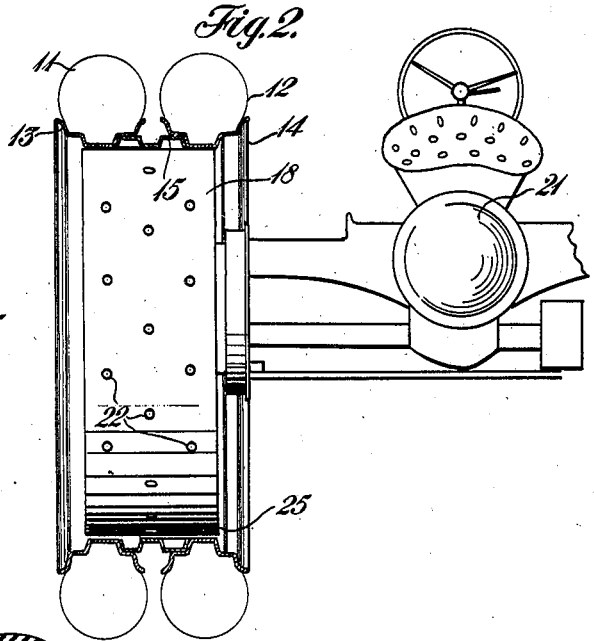
Figure 2 is an elevation, partly broken away, of the embodiment of the invention shown in Figure 1 associated with a tractor.

The wheel assembly 10 is to be associated with a tractor wheel 18 that is carried on an axle 19 of the tractor generally indicated 21. This annular tractor wheel 18 has a relatively wide, flat outer periphery which originally had a series of lugs (not shown) associated therewith. These lugs usually were secured to the tractor wheel by means of bolts or rivets which extended through the lugs and through apertures 22 formed in the tractor wheel. These apertures 22 usually are in circumferentially extending series that are spaced apart axially upon the wheel. Each separate series of apertures 22 is in a plane that is perpendicular to the axis of the tractor wheel 18, as shown in Figure 2. Then to aid in securing the wheel assembly 10 to the tractor wheel 18, suitable apertures 23 are formed in the recessed center portion 16 of the mounting band 15.

These apertures 23 are spaced so as to be in radial alignment with one of the circumferential series of apertures 22 in the tractor wheel 18 when the mounting band 15 is associated with the tractor wheel. Obviously the inner diameter of the recessed center portion 16 is made of such size that it is snugly received upon the tractor wheel 18. Then suitable means, preferably bolts 24, are inserted through the apertures 23 and the aligned apertures 22 to secure the wheel assembly 10 removably to the tractor wheel 18 so that the tire or wheel tread assembly can be removed from the tractor wheel, if desired.

Usually further means are associated with the rims 13 and 14 and the mounting band 15 to aid in mounting same. In this instance, metallic bars or shims 25 are inserted between the flat bases of the rims 13, 14 and the wheel 18, and the recessed portion 16 and the wheel 18 to compensate for any irregularity in the annularity of the wheel. These shims 25 have apertures 26 formed at their inner ends, and are so positioned that one of the apertures 26 is in radial alignment with one of the apertures 23 in the mounting band 15 and the aligned aperture 22 in the tractor wheel 18 so that the shims can be held in place by the bolts 25. The shims may act to support, at least partially, the rims 13 and 14 upon the tractor wheel 18 when a wide surfaced wheel, as shown, is used. Or, the rims may be partially supported by the tractor wheel by directly engaging with the circumference thereof. Usually, however, the rims 13 and 14 are entirely supported through the mounting band 15 so that the tread unit of the invention can be mounted on any wheel which is wide enough to support the channel 16 of the mounting band 15. In some cases, it may be desirable to have the rims 13 and 14 removably and possibly even adjustably associated with the mounting band 15, by means, not shown, but well known in the art.

Figure 2 shows that there are three axially spaced circumferentially extending series of apertures in the tractor wheel 18. Hence it will be seen that the axial position of the wheel assembly 10 upon the tractor wheel 18 may be varied by changing the series of circumferential apertures with which the mounting band 15 is engaged.

From the foregoing description it should be seen that an inexpensive, sturdy changeover unit for tractor wheels is provided by the present invention. This changeover unit is readily engaged with, or disengaged from, a tractor wheel, while also being variable axially with relation to the tractor wheel. In case the tractor wheel with which the wheel assembly of the invention is to be associated does not have proper holes formed therein, these may readily be formed therein in any suitable manner, usually without impairing the normal construction of the wheel. Hence, tractor wheels, by practice of the present invention, may interchangeably carry either pneumatic rubber tires, or the metallic lugs usually furnished therefor as original equipment.

Even though the construction of the invention is particularly suited for mounting dual wheels, it may be used to mount individual rubber tires upon annular cylindrical metal wheels.

Figure 4 is a sectional elevation of a modified embodiment of the invention wherein only one pneumatic tire 12a, is mounted upon a wheel 18a. The tire is positioned upon a rim 14a that in turn, is supported by a channeled member 15a that is secured to the wheel 18a by bolts 24a.

Figure 6 illustrates an embodiment of the invention wherein drop center rims 13b and 14b are supported both by an annular mounting band 15b and a wheel 18b. The mounting band is secured to the wheel by bolts 24b, as in the other embodiments of the invention.

While a written description and illustration of a specific embodiment of the invention is disclosed herein, it will be understood that modifications thereof can be made without departing from the scope of the invention as defined in the appended claims.

What is claimed is:

1. In a wheel assembly, an annular wheel having a relatively wide cylindrical outer periphery having a series of apertures therein which are in a plane perpendicular to the axis of the wheel, a rim mounting band having a recessed center portion adapted to engage with said annular wheel, securing means extending through said apertures and being associated with said recessed center portion to secure said rim mounting band to said annular wheel, and a tire rim, having a flat base portion, associated with each extremity of said rim mounting band, the base portions of said rims being engaged with said annular wheel and a side portion of each of said rims being supported by said rim mounting band.

2. In a wheel assembly, an annular wheel having a series of apertures therein which are in a plane perpendicular to the axis of the wheel, a rim mounting band having a recessed center portion adapted to engage with said annular wheel, means extending through said apertures and being associated with said recessed center portion to secure said rim mounting band to said annular wheel, and a tire rim, having a flat base portion, secured to each extremity of said rim mounting band, the base portions of said rims being engaged with said annular wheel and a side portion of each of said rims being supported by said rim mounting band.

3. In a tractor wheel assembly, a tractor wheel having a smooth annular outer surface and a set of circumferentially spaced apertures therein which is in a plane perpendicular to the axis of said tractor wheel, a substantially cylindrical member adapted to be positioned in superposed relation to said tractor wheel and be engaged therewith, means associated with said apertures for securing said member to said tractor wheel, and a drop center rim secured to said member, said rim having an edge portion that bears upon an edge portion of said cylindrical member and is supported thereby in spaced relation to said wheel.

4. In a wheel assembly, an annular wheel having a set of circumferentially positioned apertures therein which are in a plane perpendicular to the axis of the wheel, an apertured annular member the sides of which are adapted to engage with pneumatic tire rims, means removably associating said annular member with said wheel by engaging with said apertures, and tire rims secured to and positioned by the sides of said annular member.

5. A tread assembly adapted to be secured as a unit to a wheel member, said tread assembly comprising an annular mounting band having a recessed apertured center portion and side portions adapted to engage with and support side portions of pneumatic tire rims, and spaced pneumatic tire rims engaged with the side portions of and secured to said mounting band whereby said apertured center portion is exposed and is adapted to be secured to a wheel member.

6. In a wheel assembly, a substantially cylindrical wheel, a tread unit for said wheel comprising a mounting band having a channeled center portion and inwardly flanged sides that are axially spaced from the channeled portion of the mounting band by cylindrical portions that are substantially concentric with said wheel, the channeled portion of said mounting band being apertured to facilitate engagement with said wheel, and a drop center rim welded to said mounting band at each side thereof, one part of each of said rims being engaged with one of said inwardly flanged sides and another part being supported by one of said cylindrical portions of said mounting band.

7. In a wheel assembly, a substantially cylindrical wheel, a tread unit for said wheel comprising a mounting band having a channeled center portion and inwardly flanged sides that are axially spaced from the channeled portion of the mounting band by cylindrical portions that are substantially concentric with said wheel, and a drop center rim secured to said mounting band at one side thereof, one part of said rim being engaged with one of said inwardly flanged sides and another part being supported by one of said cylindrical portions of said mounting band whereby said rim can be supported independently of said wheel.

8. A wheel assembly as in claim 6 wherein a plurality of shims are positioned between said mounting band and said wheel to aid in positioning said mounting band and said rims upon said wheel.

9. In combination with a tractor wheel having a cylindrical periphery, which tractor wheel originally had lugs secured thereto but which are now removed therefrom, an annular base member removably secured to said tractor wheel, and a drop center rim associated with each side of said base member, said rims being supported by the outer edges thereof engaging with the edge portions of said base member and by the rim bases engaging with said tractor wheel, whereby said base member can be removed from said tractor wheel and said lugs secured thereto in place of said base member.

10. A combination as in claim 9 wherein only one rim is associated with said base member.

WINFIELD S. BRINK.